United States Patent
Bala et al.

(10) Patent No.: US 11,923,761 B2
(45) Date of Patent: Mar. 5, 2024

(54) WIDE-RANGE GAIN CONVERTERS

(71) Applicant: AcLeap Power Inc., Taipei (TW)

(72) Inventors: Sandeep Bala, Raleigh, NC (US); Liming Liu, Cary, NC (US); Jing Xu, Cary, NC (US)

(73) Assignee: AcLeap Power Inc., Taipei (TW)

( * ) Notice: Subject to any disclaimer, the term of this patent is extended or adjusted under 35 U.S.C. 154(b) by 283 days.

(21) Appl. No.: 17/087,795

(22) Filed: Nov. 3, 2020

(65) Prior Publication Data
US 2021/0050793 A1    Feb. 18, 2021

Related U.S. Application Data

(63) Continuation of application No. 16/428,879, filed on May 31, 2019, now Pat. No. 10,826,405.

(51) Int. Cl.
*H02M 1/14*    (2006.01)
*H02M 3/00*    (2006.01)
*H02M 3/335*    (2006.01)

(52) U.S. Cl.
CPC ............ *H02M 1/14* (2013.01); *H02M 3/01* (2021.05); *H02M 3/33592* (2013.01)

(58) Field of Classification Search
CPC .. H02M 1/14; H02M 3/33592; H02M 1/0058; H02M 3/33507; H02M 3/33576; H02M 3/01; H02M 3/015; H02M 3/33569; H02M 3/33584; H02M 3/33571; H02M 3/33573; H02M 1/0074; H02M 1/0083; H02M 1/0095; H02M 1/007; Y02B 70/10
USPC ...................................................... 363/21.02
See application file for complete search history.

(56) References Cited

U.S. PATENT DOCUMENTS

| | | | |
|---|---|---|---|
| 5,166,869 A | 11/1992 | Testerman | |
| 5,859,771 A | 1/1999 | Kniegl | |
| 5,946,206 A * | 8/1999 | Shimizu | H02M 3/285 363/16 |
| 6,111,769 A | 8/2000 | Zhang et al. | |

(Continued)

FOREIGN PATENT DOCUMENTS

| | | |
|---|---|---|
| CN | 106253359 A | 12/2016 |
| CN | 109067190 A | 12/2018 |

(Continued)

OTHER PUBLICATIONS

Attached a translated version of foreign patent CN109687715. (Year: 2019).*

(Continued)

*Primary Examiner* — Emily P Pham
(74) *Attorney, Agent, or Firm* — Armstrong Teasdale LLP (57) ABSTRACT

According to an aspect of this disclosure, a circuit includes a voltage source and an output load, first and second resonant modules disposed between the voltage source and the output load, and first and second transformers. The circuit is further arranged such that the first transformer is disposed between the first resonant module and the output load, and the second transformer is disposed between the second resonant module and the output load. The circuit also includes a plurality of half-bridges coupled between the first and second resonant modules and the voltage source. The circuit further includes a voltage divider disposed between the voltage source and the plurality of half-bridges.

19 Claims, 6 Drawing Sheets

(56) References Cited

U.S. PATENT DOCUMENTS

| | | | |
|---|---|---|---|
| 6,490,183 | B2 | 12/2002 | Zhang |
| 7,782,639 | B2 | 8/2010 | Vinciarelli |
| 8,089,788 | B2 | 1/2012 | Jain |
| 8,593,209 | B2 | 11/2013 | Oughton, Jr. et al. |
| 8,842,448 | B2 * | 9/2014 | Ye .................... H02M 3/33571 363/21.02 |
| 9,509,225 | B2 | 11/2016 | Stephens et al. |
| 9,998,018 | B2 | 6/2018 | Fu et al. |
| 10,804,812 | B1 * | 10/2020 | Dehem ............... H02M 3/1584 |
| 10,826,405 | B1 | 11/2020 | Bala et al. |
| 2010/0328967 | A1 * | 12/2010 | Cody .................. H02M 3/3376 363/21.02 |
| 2011/0007527 | A1 | 1/2011 | Liu et al. |
| 2013/0135903 | A1 | 5/2013 | Fu et al. |
| 2013/0201726 | A1 | 8/2013 | Hu et al. |
| 2014/0153293 | A1 | 6/2014 | Chang et al. |
| 2014/0153294 | A1 | 6/2014 | Deboy et al. |
| 2014/0268907 | A1 | 9/2014 | Cinagrossi et al. |
| 2015/0229225 | A1 | 8/2015 | Jang et al. |
| 2016/0016479 | A1 | 1/2016 | Khaligh et al. |
| 2016/0079862 | A1 * | 3/2016 | Stephens ............ H02M 3/3376 363/21.02 |
| 2017/0012547 | A1 | 1/2017 | Jitaru |
| 2017/0085183 | A1 | 3/2017 | Notsch |
| 2018/0152112 | A1 | 5/2018 | Torrico-Bascope |
| 2018/0198373 | A1 | 7/2018 | Torrico-Bascope et al. |
| 2019/0044447 | A1 | 2/2019 | Wang |
| 2019/0214912 | A1 * | 7/2019 | Hong .................. H02M 3/1582 |
| 2020/0083818 | A1 * | 3/2020 | Lin ........................ H01F 3/14 |
| 2020/0321878 | A1 * | 10/2020 | Zhang .................. H02M 7/483 |
| 2020/0336068 | A1 * | 10/2020 | Bala .................. H02M 3/33571 |
| 2020/0366204 | A1 * | 11/2020 | Shen ................... H02M 7/4837 |
| 2020/0366215 | A1 * | 11/2020 | Chen ...................... H02M 7/04 |

FOREIGN PATENT DOCUMENTS

| | | | | |
|---|---|---|---|---|
| CN | 208353221 | * | 1/2019 | ............. H02M 1/14 |
| CN | 109687715 | * | 4/2019 | ........... H02M 3/335 |
| JP | H06111976 A | | 4/1994 | |
| JP | 2013251963 | * | 12/2013 | ........... H02M 3/155 |

OTHER PUBLICATIONS

Attached a translated version of foreign patent JP2013251963. (Year: 2013).*

See attached translated foreign patent CN208353221 U. (Year: 2019).*

W. Feng, and F. C. Lee, "Simplified optimal trajectory control (SOTC) for LLC resonant converters." IEEE Trans. on Power Electron., May 2013.

F. Canales, T. H. Li, D. Aggeler, "Novel Modulation Method of a Three-level Isolated Full-Bridge LLC Resonant DC-DC Converter for Wide-Output Voltage Application," in EPE-PEMC 2012 ECCE Europe.

H.-N. Vu and W. Choi, "A Novel Dual Full-Bridge LLC Resonant Converter for CC and CV Charges of Batteries for Electric Vehicles," IEEE Trans. On Ind. Electron., Mar. 2018.

J.-B. Lee et al., "Resonant Capacitor On/Off Control of Half-Bridge LLC Converter for High-Efficiency Server Power Supply," IEEE Trans. On Ind. Electron., Sep. 2016.

C.-O. Yeon et al., "A New LLC Resonant Converter with Resonant Frequency Change for High Conversion Efficiency and High Power Density," in IFEEC 2017 ECCE Asia.

Jaesung Oh et al., "A 3-Bridge LLC Resonant Converter Operating with a Wide Output Voltage Control Range Using Morphing Control for Mode Transitions", 2019 IEEE Applied Power Electronics Conference and Exposition (APEC), Mar. 2019, 5 pages.

Chinese Office Action for Application 202010460534.8, dated Sep. 26, 2023, 10 pps.

* cited by examiner

WIDE-RANGE GAIN CONVERTERS

CROSS-REFERENCE TO RELATED APPLICATION

This application is a continuation of U.S. patent application Ser. No. 16/428,879, filed May 31, 2019, now issued as U.S. Pat. No. 10,826,405, the entire disclosure of which is incorporated herein by reference.

TECHNICAL FIELD

The present subject matter relates to power conversion and, more particularly, to resonant converters.

BACKGROUND

Often times, electronics and other applications call for power characteristics that are different from available power sources. Converters, transformers, and/or combinations thereof address the problem of mismatched power sources and power needs. A converter is an electronic circuit or electromechanical device that converts a source of direct current (DC) from one voltage level to another. A transformer is conventionally utilized to increase or decrease the alternating voltages in electric power applications. A resonant converter is a type of electric power converter that contains a network of inductors and capacitors called a resonant tank. The values of the inductors and capacitors are selected so that the network resonates at a specific frequency. However, power conversion may be costly, in terms of component size, expense, noise introduction, power consumption, thermal load, etc. Converters situated proximal an electronics application, so-called point of load (POL) converters, are perhaps even more susceptible to these challenges. As such, an LLC resonant converter with a wide gain range and efficient control, as disclosed herein, represents an improvement in the art.

The description provided in the background section should not be assumed to be prior art merely because it is mentioned in or associated with the background section. The background section may include information that describes one or more aspects of the subject technology.

SUMMARY

According to an aspect of this disclosure, a power converter includes an input to receive an input voltage and a voltage divider, having first and second sides, disposed across the input. The power converter further includes a first half-bridge coupled between the first side of the voltage divider and a first resonant circuit module, and a second half-bridge coupled between the second side of the voltage divider and a second resonant circuit module. The power converter still further includes a high voltage half-bridge disposed across the input and coupled to at least one of the first and second resonant circuit modules, and an output coupled to the first and second resonant circuit modules to supply an output voltage. In accordance with this aspect, the power converter is arranged such that each of the first half-bridge, the second half-bridge, and the high voltage half-bridge comprises a plurality of switches to control power supplied to the first and second resonant circuit modules.

According to another aspect of this disclosure, a circuit includes a voltage source and an output load, first and second resonant modules disposed between the voltage source and the output load, and first and second transformers. The circuit is further arranged such that the first transformer is disposed between the first resonant module and the output load, and the second transformer is disposed between the second resonant module and the output load. The circuit also includes a plurality of half-bridges coupled between the first and second resonant modules and the voltage source. The circuit further includes a voltage divider disposed between the voltage source and the plurality of half-bridges.

According to yet another aspect, a method of operating a converter includes coupling an input of the converter to a voltage source to supply voltages to at least three half-bridges of the converter such that at least one of the at least three half-bridges is supplied with voltage via a voltage divider, and coupling an output of the converter to an output load to supply voltages from first and second transformers of the converter to the output load. Also, according to this aspect, the method includes controlling switches of the at least three half-bridges to control operation of (i) a first resonant circuit coupled between two of the at least three half-bridges and the first transformer and (ii) a second resonant circuit coupled between two of the at least three half-bridges and the second transformer.

Other aspects and advantages of the present invention will become apparent upon consideration of the following detailed description and the attached drawings wherein like numerals designate like structures throughout the specification.

BRIEF DESCRIPTION OF THE DRAWINGS

The detailed description below refers to the appended drawings, in which.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject matter disclosed.

DETAILED DESCRIPTION OF THE DRAWINGS

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, modules and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

Isolated POL converters are suitable in numerous applications that call for high power density and high efficiency. Example applications include electric vehicle chargers and/or other DC-DC converters for which supporting a wide range of input and output voltages may be desirable. The LLC resonant converter 100, described herein with reference to FIGS. 1-5, meets the high power density and high efficiency specifications of such applications at a reduced cost relative to conventional isolated POL converters.

Figure 1:
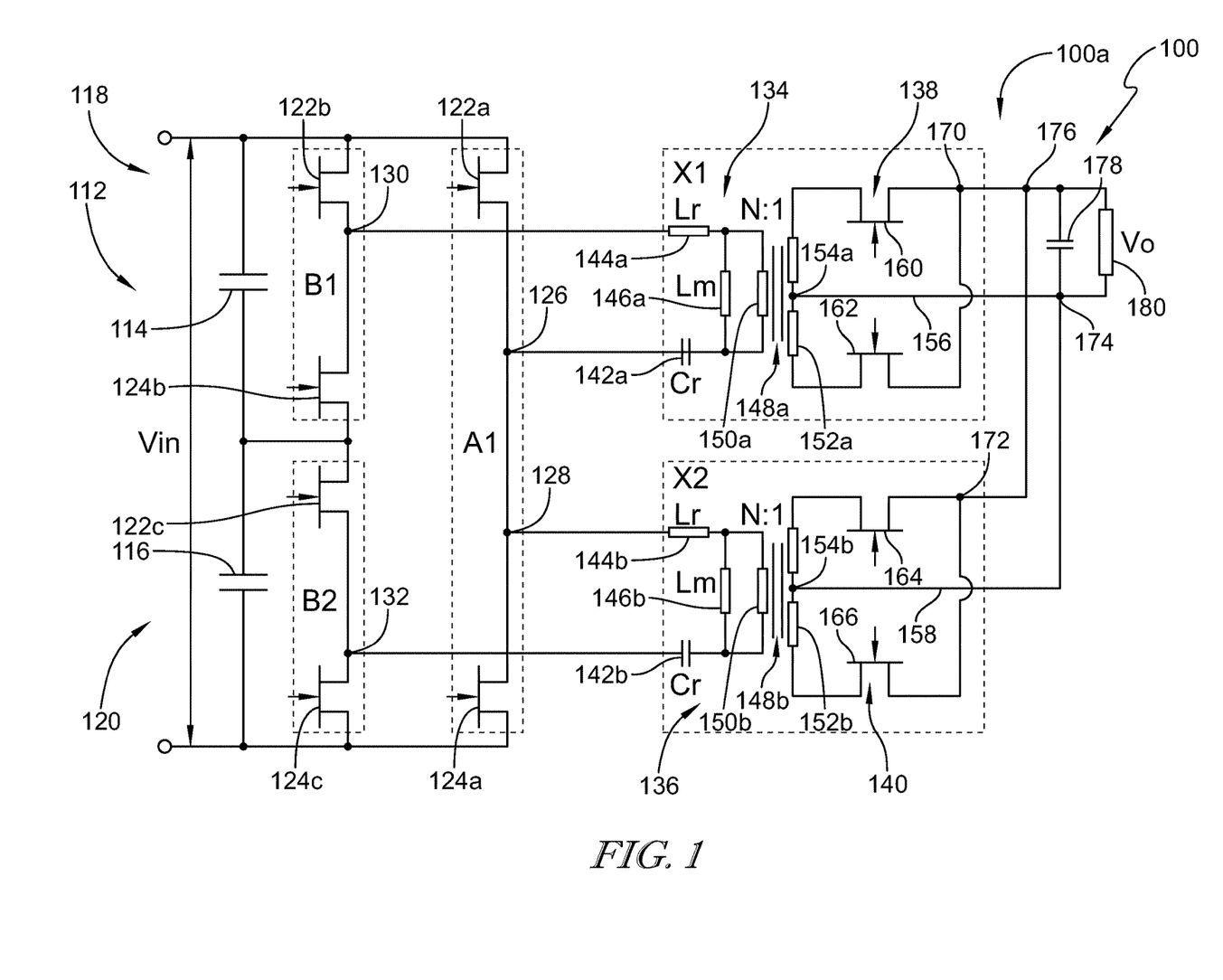
FIG. 1 is a schematic circuit diagram illustrating an LLC resonant converter circuit arrangement for developing one or more voltage steps with a wide gain range.

Referring now to FIG. 1, the LLC resonant converter 100 develops a voltage gain range 102 (see FIG. 2) described by Equation (1):

$$\text{Voltage gain range} = \text{Max}(V_o/V_{in})/\text{Min}(V_o/V_{in}) = V_{o\text{-}max}/V_{o\text{-}min} \times V_{in\text{-}max} \quad (1)$$

Conventional LLC converters experience normal operating conditions within a voltage gain range at or below two. Often times, a voltage gain range of approximately one is perceived as ideal for operation of a conventional LLC converter. However, a realistic example application may involve an output voltage varying between 0.5V and 2V while an input voltage varies between 40V and 60V. Consequently, such an example application calls for a voltage gain range of approximately six (i.e., (2/0.5)×(60/40)=6).

In contrast, the voltage gain range 102 developed by the LLC resonant converter 100 of FIGS. 1-5 is six or greater. The LLC resonant converter 100 provides a circuit topology that implements a plurality of coarse voltage steps 104 of the voltage ratio 106. Further, the circuit topology of the LLC resonant converter 100 features a reduced number of switches. The LLC resonant converter 100 maintains a relatively high power throughput capability. If desired, fine regulation of the LLC resonant converter 100 may be implemented with conventional frequency regulation.

Referring still to FIG. 1, the LLC resonant converter 100 implements the plurality of voltage steps 104. An example circuit arrangement 100a of the LLC resonant converter 100 comprises at least one first, high-voltage half-bridge A1. The first half-bridge A1 receives full DC voltage as an input from a voltage source $V_{in}$. The voltage source $V_{in}$ may be one or more batteries, one or more capacitors, one or more utility power sources, one or more generators, one or more photovoltaic cells, and/or another suitable voltage source. The voltage source $V_{in}$ is configured, in the example circuit arrangement 100a of FIG. 1, as a DC voltage bus bar 112 with first and second capacitors 114, 116 disposed at first and second halves 118, 120 thereof.

The LLC resonant converter 100 of FIG. 1 further comprises first and second voltage divider/low voltage half-bridges B1, B2. The first and second voltage divider half-bridges B1, B2 each receive as inputs one-half of the DC voltage developed across the DC voltage bus bar 112. The DC voltage bus bar 112 develops one-half of the DC voltage from each of the first and second capacitors 114, 116 corresponding to the first and second halves 118, 120. The first half-bridge A1 comprises first and second switches 122a, 124a, the first voltage divider half-bridge B1 comprises first and second switches 122b, 124b, and the second voltage divider half-bridge B2 comprises first and second switches 122c, 124c.

First and second tank-transformer-rectifier modules X1, X2 are disposed in electrical connection with first and second nodes 126, 128 of the first half-bridge A1 and the nodes 130, 132 of the respective first and second voltage divider half-bridges B1, B2. Each of the first and second tank-transformer-rectifier modules X1, X2 comprise respective first and second resonant modules 134, 136 and first and second rectifier modules 138, 140.

Referring now to the first tank-transformer-rectifier module X1, the first resonant module 134 thereof comprises a resonant capacitor 142a, a resonant inductor 144a, a magnetizing inductor 146a, and a transformer 148a. According to an example embodiment, the transformer 148a is a center-tapped transformer comprising a primary winding 150a, a secondary winding 152a, and a center tap 154a providing a first output 156 from the first resonant module 134. In example embodiments, the magnetizing inductor 146a may be disposed within the transformer 148a.

Similarly, the second tank-transformer-rectifier modules X2 includes the second resonant module 136. The second resonant module 136 comprises a second resonant capacitor 142b, a second resonant inductor 144b, a second magnetizing inductor 146b, and a second transformer 148b. Again, the transformer 148b of the second resonant module 136 is a center-tapped transformer comprising a primary winding 150b, a secondary winding 152b, and a second center tap 154b providing a second output 158 of the second resonant module 136. The first and second center taps 154a, 154b are operatively coupled to one another at first output node 174. Similar to the first transformer 148a, the second resonant inductor 144b may be disposed within the second transformer 148b.

The first node 126 of the first half-bridge A1 is operatively coupled as an input to the resonant capacitor 142a of the first resonant module 134. Further, the second node 128 of the first half-bridge A1 is operatively coupled as an input to the second resonant inductor 144b of the second resonant module 136. The node 130 of the first voltage divider half-bridge B1 is operatively coupled as an input to the first resonant inductor 144a of the first resonant module 134. Still further, the node 132 of the second voltage divider half-bridge B2 is operatively coupled as an input to the second resonant capacitor 142b of the second resonant module 136. Accordingly, the switches 122a-c, 124a-c of the first half-bridge A1 and the first and second voltage divider half-bridges B1, B2 together operate to control inputs supplied to both the first and second resonant modules 134, 136. According to another embodiment, the coupling arrangement of the first node 126 and the node 130 of the first voltage divider half-bridge B1 may be interchanged one with the other. Likewise, couplings of the second node 128 and the node 132 of the second voltage divider half-bridge B2 may be interchanged one with the other.

The first and second tank-transformer-rectifier modules X1, X2 comprise first, second, third, and fourth output switches 160, 162, 164, 166 within the first and second rectifier modules 138, 140. The secondary winding 152a of the first transformer 148a is operatively coupled to the first and second output switches 160, 162. The first and second output switches 160, 162 control a second output 170 of the first rectifier module 138. Likewise, the secondary winding 152b of the second transformer 148b is operatively coupled to the third and fourth output switches 164, 166. The third and fourth output switches 164, 166 control a second output 172 of the second rectifier module 140. The second outputs 170, 172 of the respective first and second rectifier modules 138, 140 are operatively coupled to one another at second output node 176.

The first and second outputs 156, 158, 170, 172 of the respective first and second tank-transformer-rectifier modules X1, X2 are disposed in parallel according to the embodiment 100*a* of FIG. 1. A smoothing capacitor 178 is disposed in parallel with an output load 180 across which an output voltage $V_o$ (see FIG. 3) is developed. The first and second output nodes 174, 176 are operatively coupled to the smoothing capacitor 178 and the output load 180. In other example embodiments, outputs from the tank-transformer-rectifier modules X1, X2 may be disposed in series, depending upon the specifications called for by a particular application.

Figure 2:
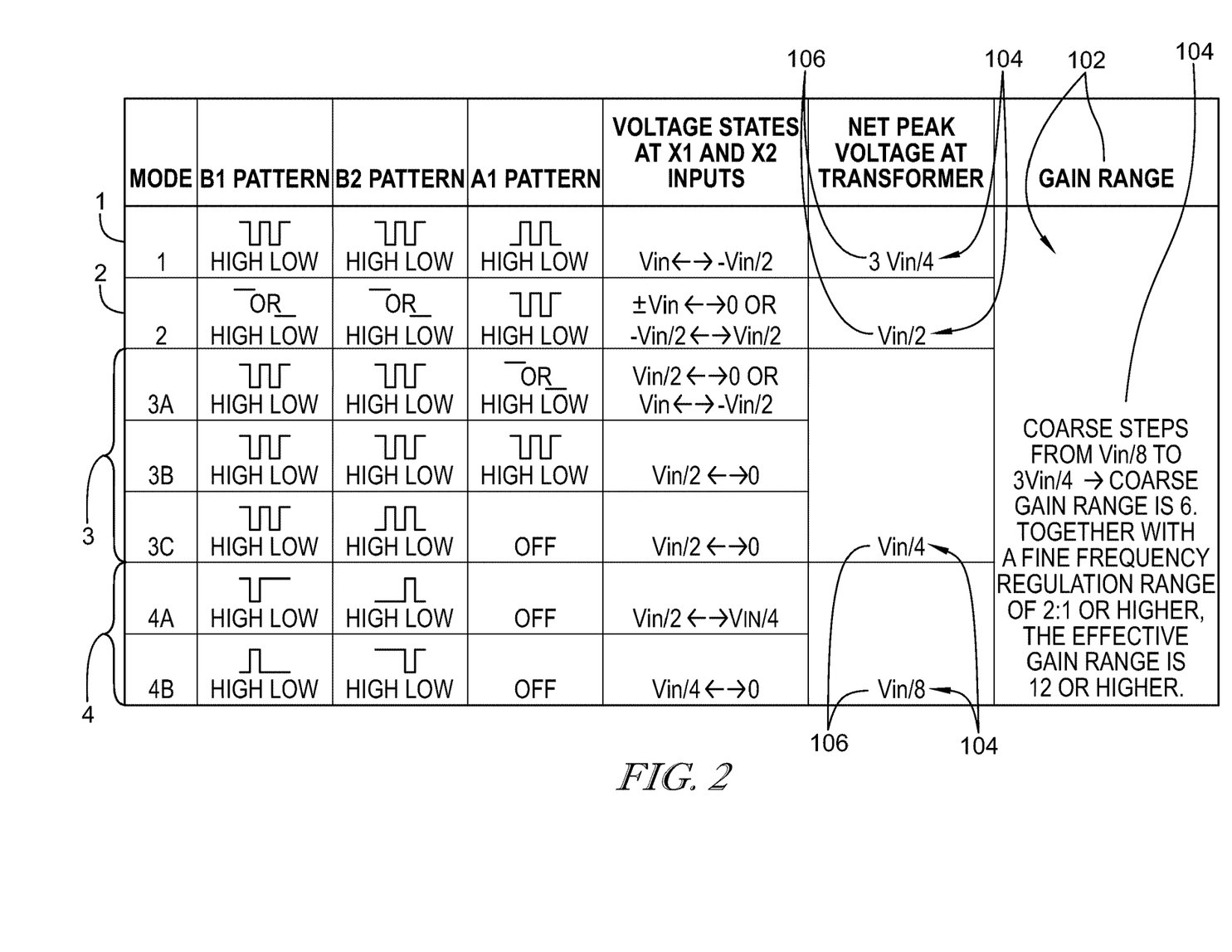
FIG. 2 is a chart representing operational modes and switching patterns of the LLC resonant converter of FIG. 1 and output voltages resulting therefrom.

FIG. 2 is a table representing first, second, third, and fourth operating modes 1, 2, 3, 4 of the LLC resonant converter 100. The entries of the table illustrate switching patterns and timing for each of the first half-bridge A1 and the first and second voltage divider half-bridges B1, B2. For each of the half-bridges A1, B1, B2, there are three allowed states that together may be combined to implement the four modes 1, 2, 3, 4 wherein mode 3 further comprises sub-modes 3*a*, 3*b*, 3*c*, and mode 4 further comprises sub-modes 4*a*, 4*b*. In example embodiments, a greater or lesser number of modes may be implemented. In the first state (i.e., a "high" state of a half-bridge) the first switch 122*a, b, c* of the respective half-bridge A1, B1, B2 is ON, and the second switch 124*a, b, c* thereof is OFF. The second state (i.e., a "low" state of a half-bridge) corresponds to the first switch 122*a, b, c* of the respective half-bridge A1, B1, B2 being OFF, and the second switch 124*a, b, c* thereof being ON. In the third state (i.e., an "OFF" state of a half-bridge) both of the first and second switches 122*a, b, c*, 124*a, b, c* of the respective half-bridge A1, B1, B2 are OFF.

In each of the operating modes 1, 2, 3, and 4, each half-bridge may either switch between the "high" and "low" states or stay fixed at one of the "high", "low", or "OFF" states. As a result, the voltages appearing at the inputs to the tank-transformer-rectifier modules X1 and X2 are driven to alternate between two values or voltage states. The resonant capacitor(s) 142*a*, 142*b*, noted hereinabove with reference to FIG. 1, blocks DC voltage, and, therefore, the net peak voltage appearing at the transformer(s) 148*a*, 148*b* of the LLC resonant converter 100 is half the difference between the voltage states at the first and second tank-transformer-rectifier modules X1, X2 in one switching cycle. Different combinations of half-bridge operation result in different net peak voltages at the transformer(s) 148*a*, 148*b*; and, accordingly, the voltage ratio (i.e., the gain) of the LLC resonant converter 100 is effectively manipulated.

Referring to FIG. 2, in the mode 1, the half-bridges A1, B1, B2 are switched at a high frequency between the "high" and "low" states with an approximately 50% duty ratio, wherein the switching patterns of the first and second voltage divider half-bridges B1, B2 are synchronized to each other, and the switching pattern of the first half bridge A1 is phase-offset by 180 degrees (i.e., inverted) from the pattern of the first and second voltage divider half-bridges B1, B2. In the second mode 2, the first half bridge A1 is switched at a high frequency between the "high" and "low" states with an approximately 50% duty ratio, and the first and second voltage divider half-bridges B1, B2 are maintained at either "high" or "low" states. The sub-mode 3*a* comprises maintaining the first half-bridge A1 in a fixed ON or OFF state and switching the first and second voltage divider half-bridges B1, B2 at high frequency with an approximately 50% duty ratio. All three of the first half-bridge A1 and the first and second voltage divider half-bridges B1, B2 are operated synchronously at high frequency in the sub-mode 3*b*. In the sub-mode 3*c*, the first half-bridge A1 is OFF and the first and second voltage divider half-bridges B1, B2 are switched at high-frequency with an approximately 50% duty ratio and are phase offset by 180 degrees from one another. The sub-mode 4*a* comprises maintaining the first half-bridge A1 in an OFF state and operating the first and second voltage divider half-bridges B1, B2 at half the nominal frequency with an approximately 25% or 75% duty ratio and phase offset from one another. Further, the sub-mode 4*b* is similar to the sub-mode 4*a* except that the phases of the first and second voltage divider half-bridges B1, B2 are interchanged.

Figure 3:
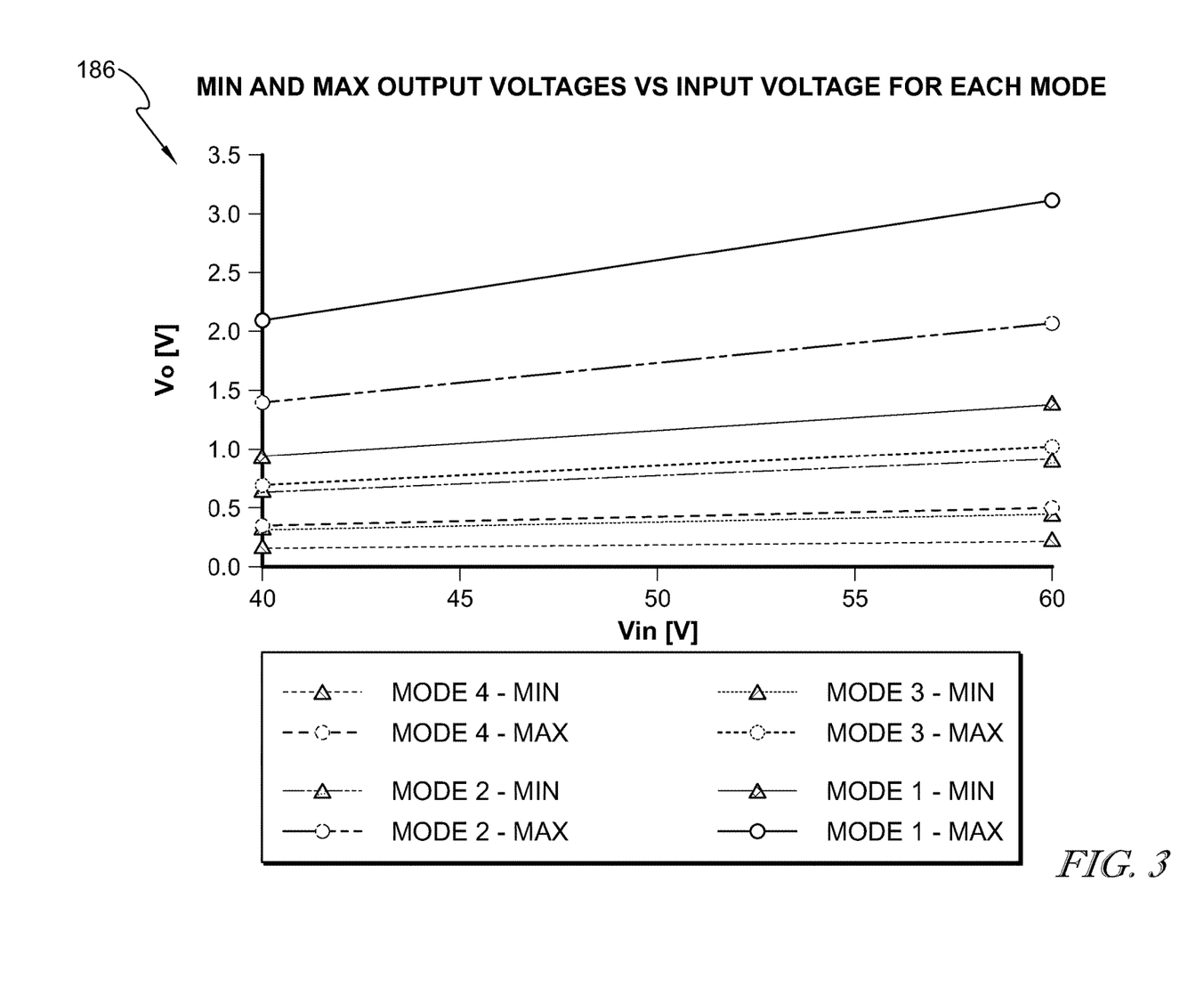
FIG. 3 is a chart representing operating modes implemented with varying input and output voltages.

The voltage range (e.g., 0.5V-2V) may be covered by a combination of switching between the modes 1, 2, 3, 4 and frequency control within a relatively narrow range. Referring now to the graph of FIG. 3, in example embodiments, the frequency-controlled LLC resonant converter voltage gain varies from 0.9 to two. Regions defined by the minimum and maximum output voltages of each mode may overlap. Further, according to example embodiments, hysteresis may be leveraged when switching from one mode to another because of the overlapping between regions illustrated in FIG. 3. This feature prevents bouncing between modes as the output voltage $V_o$ is varied. The graph of FIG. 3 represents an example of the operating modes at different combinations of input and output voltages $V_{in}$, $V_o$. In the example embodiment represented here, a turns ratio of the transformer(s) 148*a*, 148*b* are 28:1, although the present disclosure contemplates a different turns ratio dependent upon particular applications of the LLC resonant converter 100. Further, in this example embodiment, the frequency-controlled gain is variable from a minimum voltage gain of 0.9 to a maximum voltage gain of two. Output voltages $V_o$ from 0.25V to 2V are developed at each input voltage from 40V to 60V, i.e., a full range of input voltages $V_{in}$ may be accepted and a full range of output voltages $V_o$ may be generated therefrom.

Likewise, in an example embodiment utilizing only the first, second, and third modes 1, 2, 3 is desire, output voltages $V_o$ from 0.5V to 2V may be generated. The effective voltage gain range when utilizing the first through fourth modes 1, 2, 3, 4 is 13.33. Also, the effective voltage gain range when utilizing the first through third modes 1, 2, 3 is 6.67. As a result of the output voltages $V_o$ generated in accordance with FIG. 3, the modes 1, 2, 3, 4 of the LLC resonant converter 100 develop voltage regulation. As mentioned hereinabove, the developed voltage regulation may comprise coarse steps 104 (see FIG. 2). Adjusting the frequency may further develop relatively fine voltage regulation covering the entire desired range. In some example embodiments, the primary and/or secondary switches may be Gallium Nitride (GaN) high electron mobility transistors (HEMTs) and/or another suitable switch. The switching frequency during operation of the LLC resonant converter 100 may be between about 100 kHz and about 10 MHz.

Figure 4:
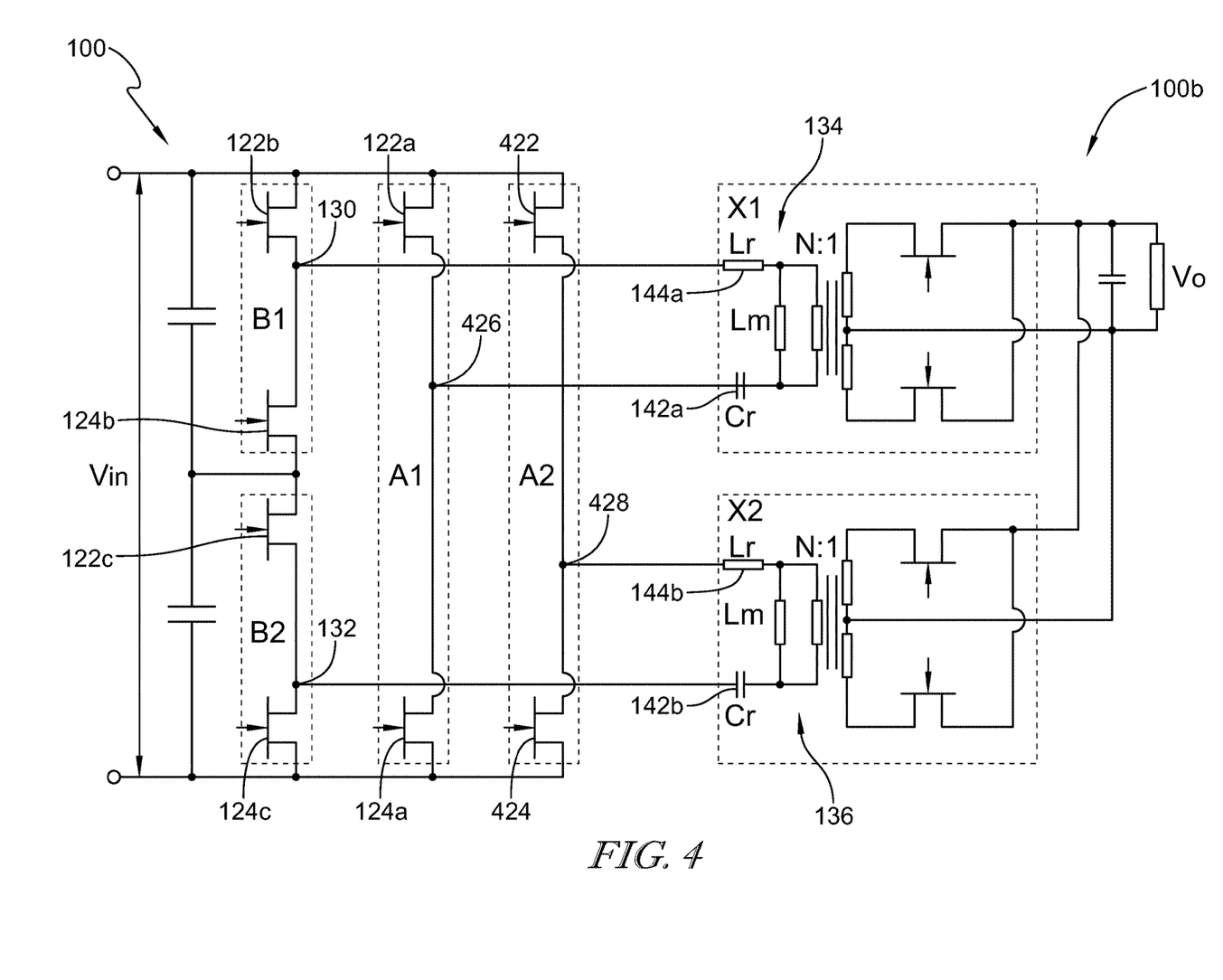
FIG. 4 is a schematic circuit diagram illustrating an LLC resonant converter circuit arrangement for developing one or more voltage steps with relatively lower gain range and improved output current ripple implemented by interleaved operation in two phases.

Referring now to FIG. 4, an example circuit arrangement 100*b* of the LLC resonant converter 100 comprises a second, high voltage half-bridge A2. As with the example circuit arrangement 100*a* of FIG. 1, the node 130 of the first voltage divider half-bridge B1 is operatively coupled as an input to the first resonant inductor 144*a* of the first resonant module 134, and the node 132 of the second voltage divider half-bridge B2 is operatively coupled as an input to the second resonant capacitor 142b of the second resonant module 136. However, in the example circuit arrangement 100b of FIG. 4, a node 426 of the first half-bridge A1 is operatively coupled as an input to the resonant capacitor 142a of the first resonant module 134. Further, a node 428 of the second half-bridge A2 is operatively coupled as an input to the second resonant inductor 144b of the second resonant module 136. The second half-bridge A2 also comprises first and second switches 422, 424. Accordingly, the switches 122a-c, 124a-c, 422, 424 of the first and second half-bridges A1, A2 and the first and second voltage divider half-bridges B1, B2 together operate to control inputs supplied to both the first and second resonant modules 134, 136. Again, analogous to the example circuit arrangement 100a of FIG. 1, in another embodiment of the example circuit arrangement 100b, the coupling arrangement of the node 426 of the first half-bridge A1 and the node 130 of the first voltage divider half-bridge B1 may be interchanged one with the other. Likewise, couplings of the node 428 of the second half-bridge A2 and the node 132 of the second voltage divider half-bridge B2 may be interchanged one with the other.

This example circuit arrangement provides for two-phase interleaved operation. Therefore, the circuit arrangement 100b of the LLC resonant converter 100 develops a relatively lower voltage gain range. Further, the circuit arrangement 100b of the LLC resonant converter 100 develops a relatively decreased output current ripple as compared with the circuit arrangement 100a of FIG. 1. The circuit arrangement 100b of FIG. 4 reduces output current ripple by feeding the second resonant module X2 an input from the second half-bridge A2 and phase-shifting the switching signals of the first half-bridge A1 and the first voltage divider half-bridge B1 by 90° as compared with the second half-bridge A2 and the second voltage divider half-bridge B2. This operational mechanism results in reduced output current ripple, but omits implementation of the particular sub-modes 3c, 4a, 4b. Instead, the sub-modes 1-3b are implemented to develop a coarsely stepped voltage gain range of three.

Figure 5:
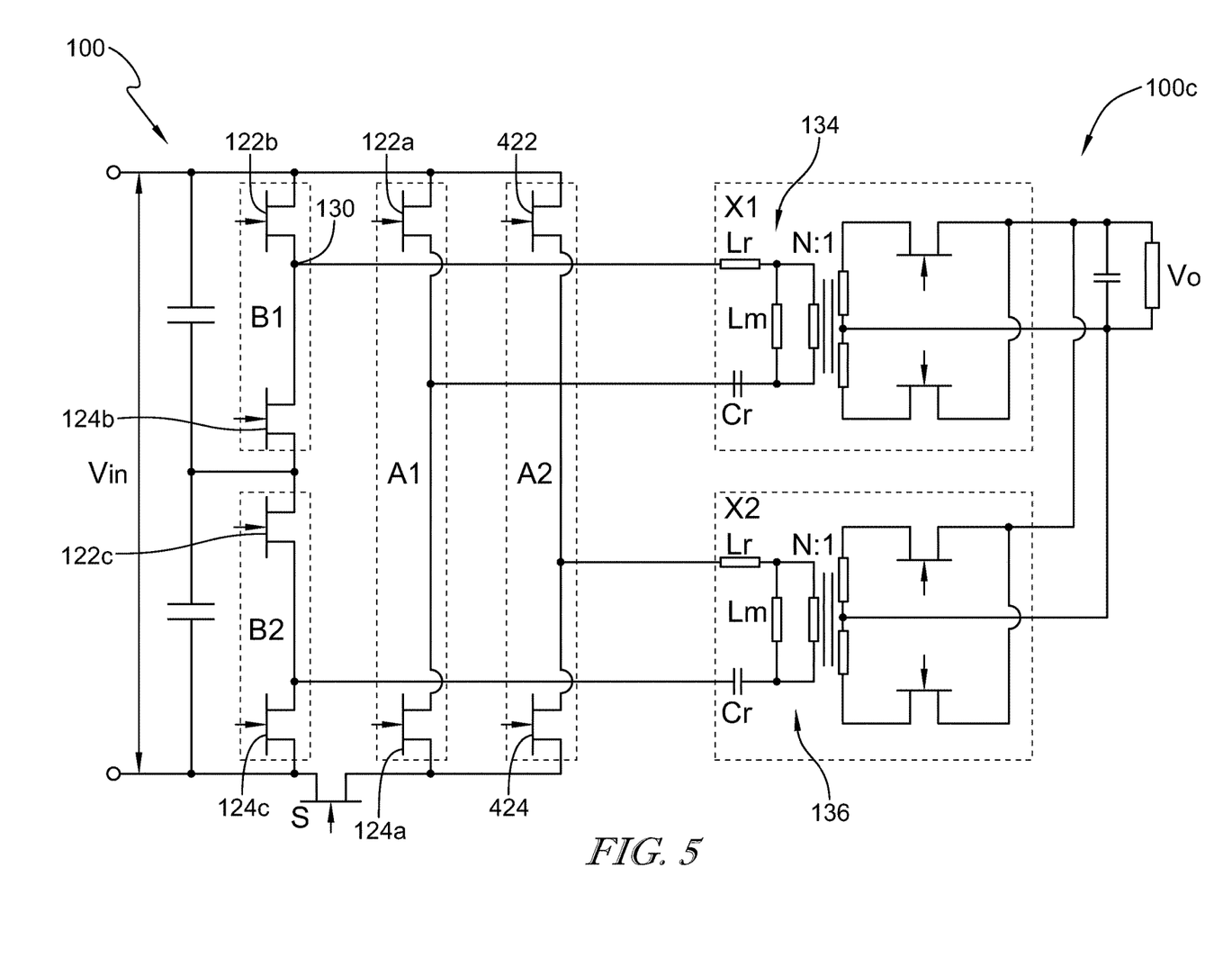
FIG. 5 is a schematic circuit diagram illustrating an LLC resonant converter circuit arrangement for developing one or more voltage steps with high gain range and improved output current ripple implemented by interleaved operation in two phases during particular operational modes/sub-modes and controlled by an interleaving switch.
Figure 6:
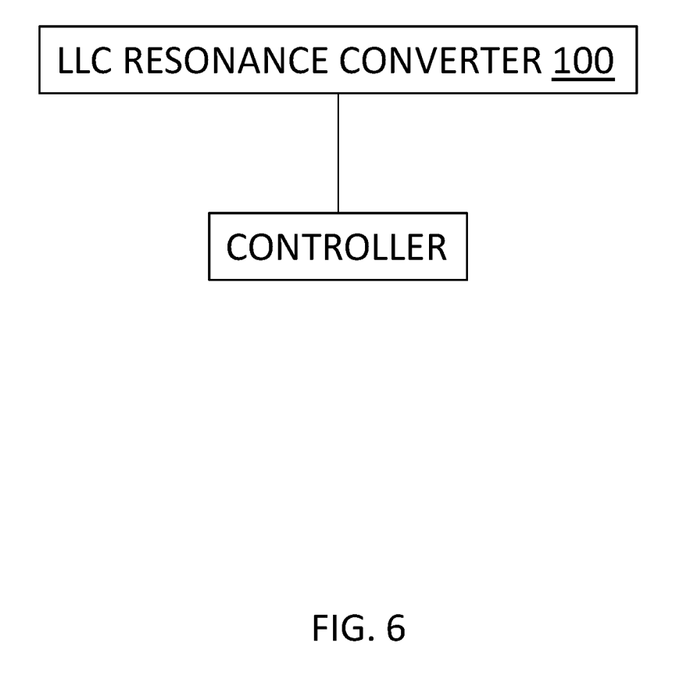
FIG. 6 is a schematic diagram of a controller for controlling the LLC resonance converter shown in FIGS. 1-5.

FIG. 5 diagrams an example circuit arrangement 100c of the LLC resonant converter 100 comprising an interleaving switch S. In the example circuit arrangement 100c shown in FIG. 5, a voltage gain range similar to the example circuit arrangement 100a of FIG. 1 is implemented with relatively decreased output current ripple for particular modes. For the example circuit arrangement 100c, inputs to the first and second resonant modules 134, 136 are interleaved in the modes 1-3b (as seen in FIG. 2) when the interleaving switch S is on. However, inputs to the first and second resonant modules 134, 136 are not interleaved in the modes 3c-4b of FIG. 2 when the interleaving switch S is off.

Referring still to FIG. 5, when the interleaving switch S is on, the remaining switches may be operated in a similar manner to the example circuit arrangement 100b (as seen in FIG. 4) in order to develop a coarsely stepped voltage gain range of three or thereabouts. Switching off the interleaving switch S, results in the first switch 122a of the first half-bridge A1 and the first switch 422 of the second half-bridge A2 remaining in the OFF state while the second switch 124a of the first half-bridge A1 and the second switch 424 of the second half-bridge A2 remain in the ON state. Accordingly, the first and second voltage divider bridges B1, B2 are operated according to one of the sub-modes 3c, 4a, or 4b. This operational mechanism restores the coarse voltage gain range to six, although the phase shifting feature, which reduces current ripple, is not available when the interleaving switch S is off.

The embodiment(s) detailed hereinabove may be combined in full or in part, with any alternative embodiment(s) described.

INDUSTRIAL APPLICABILITY

The above disclosure may represent an improvement in the art by providing a reliable, efficient, and economical isolated POL converter with high gain capabilities. The present disclosure contemplates an LLC resonant converter that expands the capabilities of and applications for LLC resonant converters. The present disclosure further contemplates improvements to POL converters that allow for wider input and output voltage ranges. Compared to prior art converters with similar voltage range capabilities, the subject matter of the instant disclosure offers greater efficiency, greater power density, and decreased expense.

While some implementations have been illustrated and described, numerous modifications come to mind without significantly departing from the spirit of the disclosure, and the scope of protection is only limited by the scope of the accompanying claims.

To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

It should be understood that the described instructions, operations, and systems can generally be integrated together in a single software/hardware product or packaged into multiple software/hardware products.

The use of the terms "a" and "an" and "the" and "said" and similar references in the context of describing the subject matter of the present disclosure (especially in the context of the following claims) are to be construed to cover both the singular and the plural, unless otherwise indicated herein or clearly contradicted by context. An element proceeded by "a," "an," "the," or "said" does not, without further constraints, preclude the existence of additional same elements. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

The invention claimed is:

1. A power circuit comprising:
a voltage source;
an output;
a first resonant circuit module disposed between the voltage source and the output, wherein the first resonant circuit module includes a first node and a second node;
a first transformer disposed between the first resonant circuit module and the output;
a second resonant circuit module disposed between the voltage source and the output, wherein the second resonant circuit module includes a third node and a fourth node;
a second transformer disposed between the second resonant circuit module and the output;
a voltage divider disposed across the voltage source;
a first half-bridge coupled with the first resonant circuit module at the first node and configured to supply a first divided voltage from the voltage divider to the first resonant circuit module;
a second half-bridge coupled with the second resonant circuit module at the fourth node and configured to supply a second divided voltage from the voltage divider to the second resonant circuit module; and
a third half-bridge coupled with the first resonant circuit module at the second node and configured to supply an undivided voltage from the voltage source to the first resonant circuit module.

2. The power circuit of claim 1, wherein the third half-bridge is further coupled with the second resonant circuit module at the third node and is configured to supply the undivided voltage from the voltage source to the second resonant circuit module.

3. The power circuit of claim 1, further comprising:
a fourth half-bridge coupled with the second resonant circuit module at the third node and configured to supply the undivided voltage from the voltage source to the second resonant circuit module.

4. The power circuit of claim 1, further comprising:
an interleaving switch disposed between (i) one of the first and second half-bridges and (ii) the third half-bridge.

5. The power circuit of claim 1, wherein the output is coupled to center taps of the first and second transformers.

6. The power circuit of claim 1, wherein one or more of the first, second, and third half-bridges are configured to implement first, second, third, and fourth operational modes to adjust voltage gain.

7. The power circuit of claim 6, wherein the first, second, third, and fourth operational modes have voltage gains varying from 0.9 to 2.

8. A power circuit comprising:
a voltage source;
an output;
a first resonant circuit module disposed between the voltage source and the output;
a second resonant circuit module disposed between the voltage source and the output;
a voltage divider disposed between (i) the voltage source and (ii) the first and second resonant circuit modules;
a first half-bridge to supply a first divided voltage from the voltage divider to the first resonant circuit module;
a second half-bridge to supply a second divided voltage from the voltage divider to the second resonant circuit module;
a third half-bridge to supply an undivided voltage from the voltage source to the first resonant circuit module and to the second resonant circuit module; and
an interleaving switch disposed between (i) one of the first and second half-bridges and (ii) the third half-bridge and configured to interleave inputs to the first resonant circuit module and the second resonant circuit module in one or more modes.

9. The power circuit of claim 8, further comprising:
a first transformer disposed between the first resonant circuit module and the output; and
a second transformer disposed between the second resonant circuit module and the output,
wherein the output is coupled to center taps of the first and second transformers.

10. The power circuit of claim 8, wherein a plurality of switches controls the first half-bridge, the second half-bridge, and the third half-bridge.

11. The power circuit of claim 10, wherein the plurality of switches operates the power circuit to adjust a voltage delivered to the output.

12. A power converter comprising:
an input to receive an input voltage;
a voltage divider disposed across the input, the voltage divider comprising first and second sides;
a first half-bridge coupled between the first side of the voltage divider and a first resonant circuit module;
a second half-bridge coupled between the second side of the voltage divider and a second resonant circuit module;
a third half-bridge disposed across the input and coupled to at least one of the first and second resonant circuit modules;
an output coupled to the first and second resonant circuit modules to supply an output voltage; and
a controller configured to operate the power converter in a plurality of modes by switching a plurality of switches disposed in the first, second, and third half-bridges such that voltages appearing at the inputs to the first resonant circuit module and the second resonant circuit module are driven to change among a plurality of voltage values.

13. The power converter of claim 12, wherein switching between the plurality of modes adjusts the output voltage over a range.

14. The power converter of claim 13, wherein the range of output voltages varies from 0.5V to 2.0V.

15. The power converter of claim 14, wherein each mode has a minimum output voltage and a maximum output voltage, and wherein the maximum output voltages of a first mode, a second mode, and a third mode overlap with the minimum output voltages of the second mode, the third mode, and a fourth mode, respectively.

16. The power converter of claim 12, wherein the first half-bridge, the second half-bridge, and the third half-bridge each comprise at least two switches of the plurality of switches.

17. The power converter of claim 16, wherein the controller is configured to switch the at least two switches of the first half-bridge, the at least two switches of the second half-bridge, and the at least two switches of the third half-bridge between states with a 50% duty ratio to implement one of the plurality of modes.

18. The power converter of claim 16, wherein the controller is configured to (i) switch the at least two switches of the first half-bridge between states with a 50% duty ratio and (ii) maintain the at least two switches of the second half-bridge and the at least two switches of the third half-bridge each in a single state to implement one of the plurality of modes.

19. The power converter of claim 16, wherein the controller is configured to (i) maintain the at least two switches of the first half-bridge each in a single state and (ii) switch the at least two switches of the second half-bridge and the at least two switches of the third half-bridge between states with a phase offset to implement one of the plurality of modes.

* * * * *